United States Patent [19]
Hagood et al.

[11] 3,749,915
[45] July 31, 1973

[54] SOLID STATE RADIATION DETECTOR

[75] Inventors: Jerry W. Hagood; Joe Shelton, both of Huntsville, Ala.

[73] Assignee: The United States of America as represented by the United States Energy Commission, Washington, D.C.

[22] Filed: Apr. 11, 1972

[21] Appl. No.: 243,365

[52] U.S. Cl. ........................... 250/83.3 R, 250/83.1
[51] Int. Cl. .............................................. G01t 1/16
[58] Field of Search ............... 250/83.6 FT, 83.3 R, 250/83.1

[56] References Cited
UNITED STATES PATENTS
3,665,441   5/1972   Suchomel et al. ........... 250/83.6 FT
3,604,931   9/1971   Kastner et al. ..................... 250/83.1

Primary Examiner—Archie R. Borchelt
Assistant Examiner—Davis L. Willis
Attorney—Roland A. Anderson

[57] ABSTRACT

A solid state radiation detector has been provided which does not require high voltage components. A charged particle collecting plate is connected to the gate of a field effect transistor which is followed by a DC amplifier and an indicator. The circuit uses a floating gate on the field effect transistor to provide improved sensitivity. The detector may be used to detect non-charged particles by placing an appropriate target forward of the collecting plate.

5 Claims, 3 Drawing Figures

SOLID STATE RADIATION DETECTOR

This invention relates generally to radiation detectors and more specifically to a solid state charged particle radiation detector which does not require high voltage circuitry.

In the field of radiation detection there is an ever increasing need for low voltage miniaturized radiation detectors. The advent of large scale atomic energy programs has increased the need for monitoring instruments for personnel protection, both for fixed location monitoring and instruments for personal wear. The cost of such instruments must be maintained as low as possible to aid in reducing the overall cost of such programs.

In space programs where radiation monitoring is of significant importance and space requirements are critical there is an obvious need for low voltage compact radiation detectors.

In view of the above needs it is an object of this invention to provide a radiation detector which requires no high voltage components and is simple to manufacture and maintain.

Another object of this invention is to provide a radiation detector which can be reduced substantially in size due to its construction of all solid state components.

Yet another object of this invention is to provide a radiation detector which detects charged particles directly or as secondary emission from a target for other nuclear radiation.

Further it is an object of this invention to provide a charged particle detector as in the above objects which automatically indicates the polarity of the detected charged particles.

Briefly, these objects are attained in a nuclear radiation detector comprising a field effect transistor, a collector connected to the gate electrode of the transistor, an amplifier connected to the drain electrode of the transistor and means connected to the output of the amplifier for indicating the charge deposited on the collector from charged particulate radiation striking the collector.

The detector may be modified to detect other radiation than charged particulate by placing a target material forward of the charge collector which provides secondary charged particle emission from radiation striking the target.

Other objects and many of the attendant advantages of the present invention will be obvious to those skilled in the art from the following detailed description taken in conjunction with the accompanying drawings.

DETAILED DESCRIPTION

Figure 1:
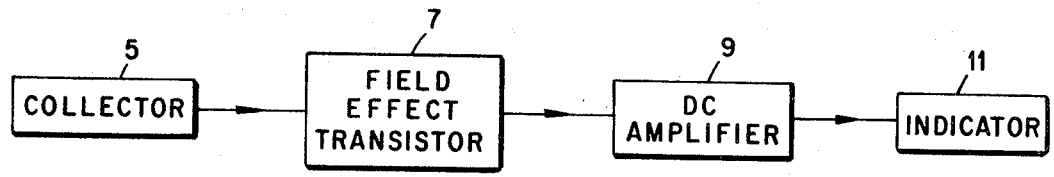
FIG. 1 is a block diagram of a nuclear radiation detector for charged particles according to the present invention.

Referring now to FIG. 1, there is shown a simplified block diagram illustrating the invention. A charge collector 5 in the form of an electrically conductive plate is connected to a field effect transistor (FET) 7. Although the collector 5 may be made of any conductive metal, it is preferred that the plate be constructed of a metal that resists the formation of an insulating oxide layer on its surface. The plate size will be determined by the sensitivity required for the instrument since the size determines the number of particles that will be collected for any given radiation level. The thickness of the plate will be determined by the mechanical characteristics required such as ruggedness and ease of fabrication.

The remainder of the detector consists of a DC amplifier 9 connected to the FET 7 and an indicator 11. The indicator may take various forms, such as a meter or an audible alarm. Preferably a meter should be of the zero center type such that both the flux density and polarity of the particles collected by the plate may be indicated.

Figure 2:
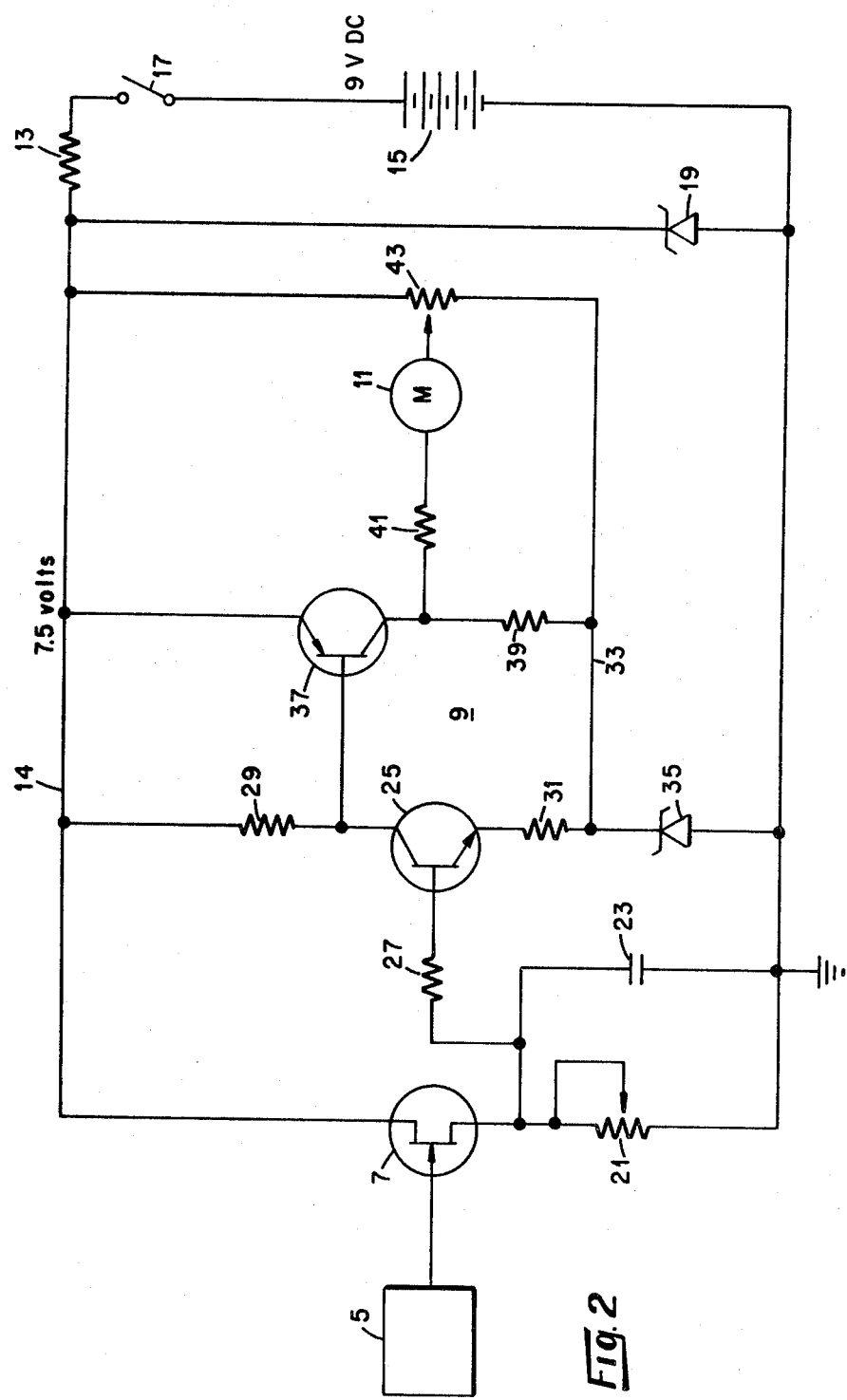
FIG. 2 is a schematic circuit diagram of the detector shown in FIG. 1.

Referring now to FIG. 2, there is shown a schematic diagram of the circuit of FIG. 1 with a zero center volt meter depicted as the indicator 11. The collector 5 is connected directly to the gate lead of the FET 7. The source lead of FET 7 is connected to a regulated supply consisting of resistor 13 and zener diode 19 and power source 15. For convenience, an on-off switch 17 may be provided in series with the power source. The voltage to the FET 7 and DC amplifier 9 is regulated at approximately 7.5 volts by means of a zener diode 19 connected between the FET 7 source lead to resistor 13 common connection line 14 and ground potential. The drain lead of FET 7 is connected to ground through a biasing circuit consisting of a variable resistor 21 and parallel connected capacitor 23.

The DC amplifier 9 consists of two transistor stages. An NPN transistor 25 is connected at its base lead to the drain lead of FET 7 through a coupling resistor 27. The collector lead of transistor 25 is connected to line 14 through a load resistor 29 and the emitter is connected through a feedback gain control resistor 31 to a common connection line 33. The common line 33 is connected to ground through a zener diode 35 having the cathode connected to line 33. The diode 35 provides proper bias for the operation of transistor 25 and transistor 37 by moving the DC operating point up to match the level of the FET 7.

A PNP transistor 37, forming the second stage, is connected at its base lead to the collector of transistor 25. The emitter of transistor 37 is connected to common line 14 and the collector is connected to common line 33 through a load resistor 39. The output of the amplifier 9 is taken at the collector of transistor 37 which is connected to one side of meter 11 through a coupling resistor 41. The other side of meter 11 is connected to the wiper arm of a meter zero or centering adjustment potentiometer 43 which is connected between common lines 14 and 33.

To calibrate the detector the amplifier gain is adjusted by the proper selection of the resistance value of resistor 31 to match the scale factor of the meter 11. Then known input voltages are impressed across the FET 7 gate to source leads and a plot is made of input voltage versus meter deflection. A source of charged particles of known flux density is then directed onto the collector 5 to activate the device and a plot is made of meter deflection versus discharge time. From these plots it is possible to determine leakage rates and thus calibrate the meter in number of particles striking the collector plate.

The operation of the device is straightforward. In the normal condition, with no charged particles present and thus no charge on the collector plate 5 and gate lead of the FET 7, the device will stabilize at some steady state condition at which it remains until a charge is deposited on the collector 5 by impinging radiation. In the steady state condition some potential, depending on circuit design and other factors, will be impressed across the gate to source leads of the FET 7. The meter may be zero centered at this point. When charged particles collect on the plate, they change the field of the FET gate region and hence the current flow from source to drain. This change in current flow is amplified by amplifier 9 and is displayed on the meter 11. It will be understood that other indicating means, as pointed out above, may be connected in the circuit in place of meter 11 or in parallel with the meter or other indicating means. It will be noted here that if it is desired to restore the meter 11 to zero following the detection of ionizing radiation without adjusting the meter bias, then the gate of the FET 7 must be shielded.

As pointed out above, this detector can be simply modified for detecting radiation other than charged particles. Since the instrument only detects charged particles, it is necessary to place a target material forward of the collector plate 5 which emits charged particles by the reaction of radiation of interest with the target material. For example, to detect thermal neutrons a target of boron ($B^{10}$) may be used. $B^{10}$ has a high capture cross section for thermal neutrons and gives an alpha particle by the reaction $N(B^{10},L^7)\alpha$. Other target materials are used for neutrons of different energies and other similar forms of radiation as is well known by those skilled in the art.

Figure 3:
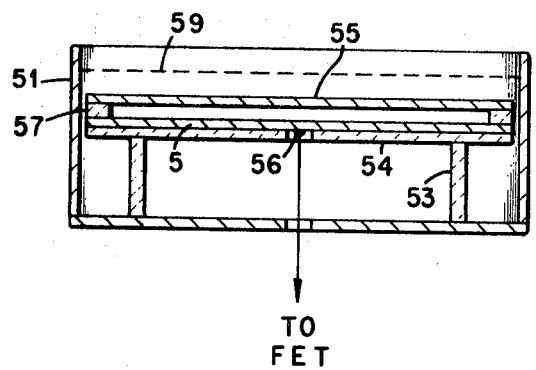
FIG. 3 is a cross sectional view of the collector plate of FIG. 2 which has been modified for the detection of radiation other than charged particle radiation.

Referring now to FIG. 3, there is shown a typical target-collector configuration for detecting thermal neutrons. The collector plate 5 in the form of a disc is disposed within a cylindrical conductive housing 51 by means of insulators 53 which support an insulating substrate 54 which carries the collector plate 5. A target 55 of $B^{10}$, also in the form of a disc the same size as the collector disc 5, is insulatably supported parallel to the collector by means of an insulator ring 57. The connection of the collector disc to the FET is made by soldering a wire to the back side of the collector as at 56 and extending the wire through an opening in the substrate 54. The front side of the target may be covered by an electrostatic shield 59 consisting of a conductive grid or mesh for the purpose of preventing static charges that may be in the vicinity from interfering with the operation of the instrument. The shield is spaced from the target and is connected to the housing 51 at its periphery.

It will be seen that a radiation detector which detects charged particles has been provided which requires no high voltage components and is simple to manufacture and operate. Due to its simplicity the production cost is sufficiently lower than that for the conventional instruments that it can be widely used in place of film badges and allow monitoring in real time. It can also be connected to an alarm without increasing the size or cost significantly. Further, due to its small size and cost, an array can be arranged, each designed for a specific part of the spectrum to be covered. The small size allows its incorporation into nuclear instrumentation with little space requirements.

Although the preferred embodiment has been described to illustrate the invention, other configurations and modifications may be made without departing from the scope of the invention as set forth in the following claims. For example, the construction shown in FIG. 3 may be further modified by use of thin film construction techniques to incorporate the electronics on the back side of the collector plate insulating substrate to further reduce the size and cost of the detector.

What is claimed is:

1. A nuclear radiation detector comprising:
    a field effect transistor having a gate, source, and drain electrode;
    a charge collector formed of an electrically conductive plate connected to said gate electrode of said field effect transistor for collecting charges deposited by charged particle nuclear radiation striking said collector;
    an amplifier coupled to said field effect transistor at said drain electrode thereof; and
    an indicating means connected to the output of said amplifier for indicating the charge deposited on said collector from said radiation striking said collector.

2. The radiation detector as set forth in claim 1 wherein said amplifier is a DC amplifier comprising a first transistor amplifier stage, a coupling resistor connecting the drain electrode of said field effect transistor to the base electrode of said first transistor amplifier stage, and a second transistor amplifier stage having the base electrode connected to the collector electrode of said first transistor amplifier stage.

3. The radiation detector as set forth in claim 2 wherein said indicating means is a zero center meter connected to the collector electrode of said second transistor amplifier stage for reading both polarity and charge of said collector.

4. The radiation detector as set forth in claim 1 further including a target means disposed forward of said collector for detecting non-charged particle radiation, said target being made of a material which upon reaction with the incident radiation releases charged particles which are detected by said collector.

5. The radiation detector as set forth in claim 4 wherein said target means includes a plate formed of boron-10 insulatably mounted over said collector for the detection of thermal neutrons which upon striking said target releases alpha particles.

* * * * *